United States Patent [19]

Alder

[11] Patent Number: 4,545,241
[45] Date of Patent: Oct. 8, 1985

[54] IN-HOLE MOTOR TACHOMETER

[75] Inventor: Robert L. Alder, Irvine, Calif.

[73] Assignee: Smith International, Inc., Newport Beach, Calif.

[21] Appl. No.: 392,292

[22] Filed: Jun. 25, 1982

[51] Int. Cl.[4] .......................... G01V 1/40; E21B 47/00
[52] U.S. Cl. ........................................ 73/151; 367/85; 175/40; 175/45; 175/107
[58] Field of Search .............. 73/151; 367/85; 175/40, 175/48, 107

[56] References Cited

U.S. PATENT DOCUMENTS

| | | | |
|---|---|---|---|
| 2,958,511 | 11/1960 | Pfefferle | 73/151 |
| 2,958,821 | 11/1960 | Webb | 73/151 |
| 3,756,076 | 9/1973 | Quichard et al. | 73/151 |
| 3,908,453 | 9/1975 | Jeter | 73/151 |
| 4,386,422 | 5/1983 | Mumby et al. | 367/85 |

OTHER PUBLICATIONS

"Borehole Telemetry", Technology Analysis, Birmiel, *Technology Assessment & Forecast,* U.S. Dept. of Commerce, P.T.O., pp. 60-66, Mar. 1977.

Primary Examiner—Howard A. Birmiel
Attorney, Agent, or Firm—Price, Gess & Ubell

[57] ABSTRACT

My invention relates to tachometers for in-hole motors, such as fluid turbine motors used in drilling of bore holes in the earth.

5 Claims, 10 Drawing Figures

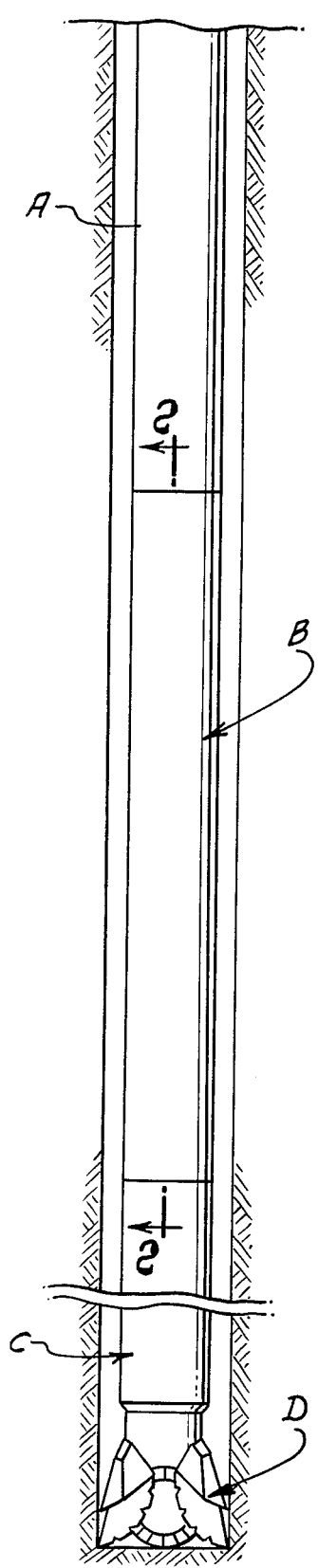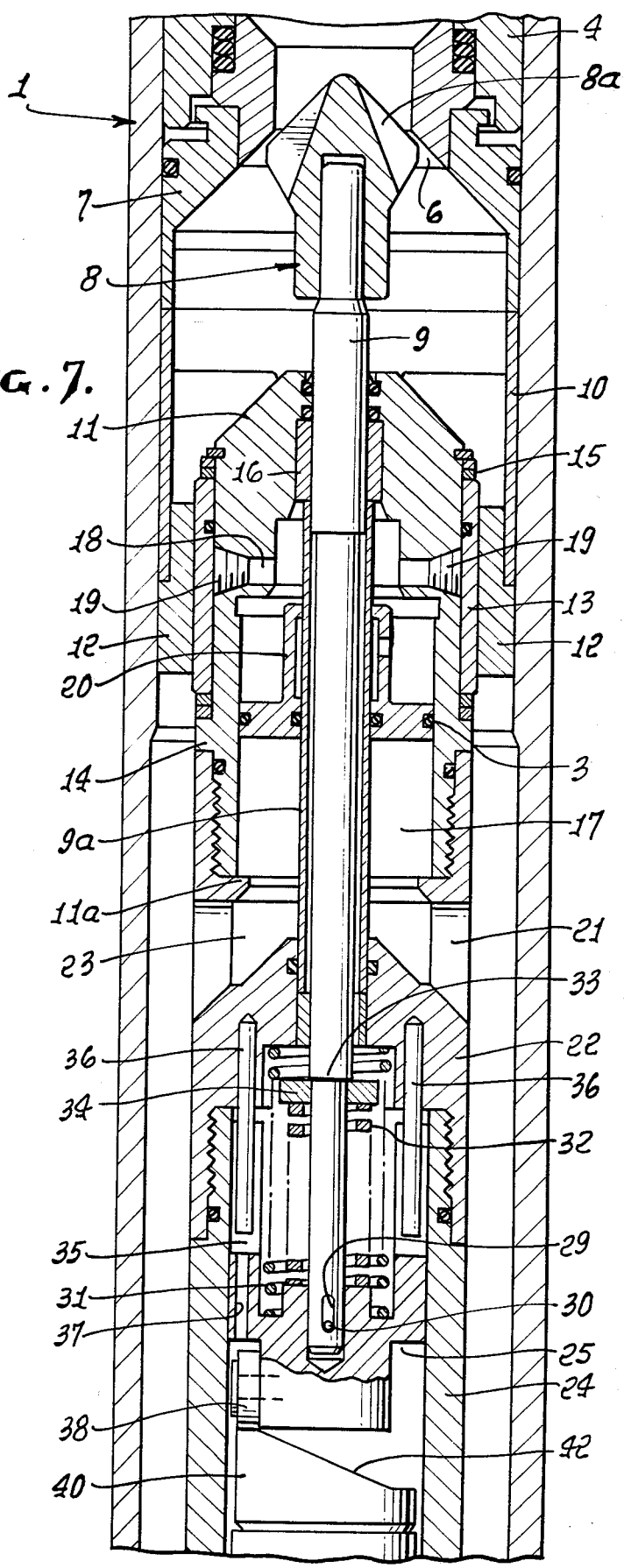

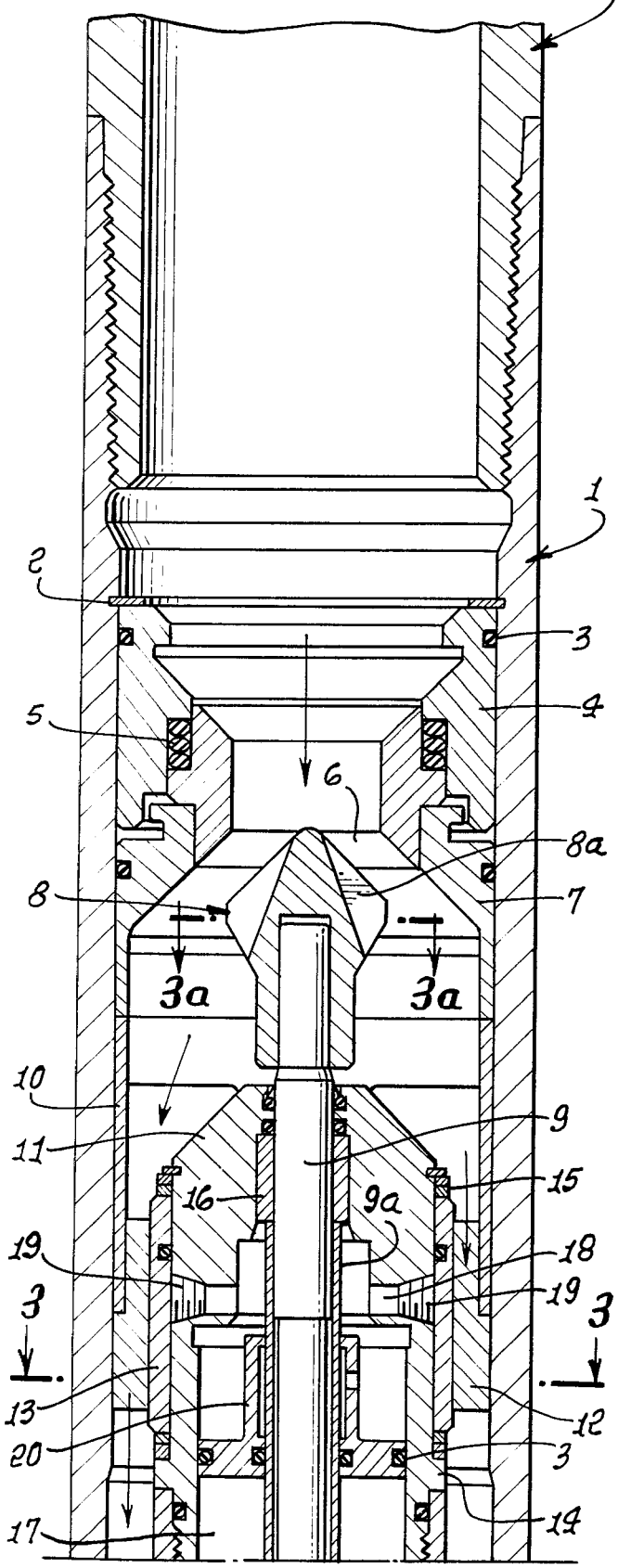
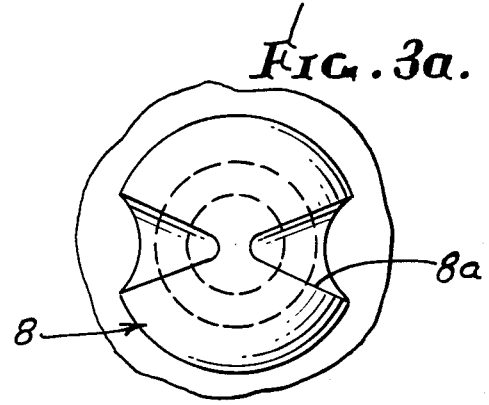
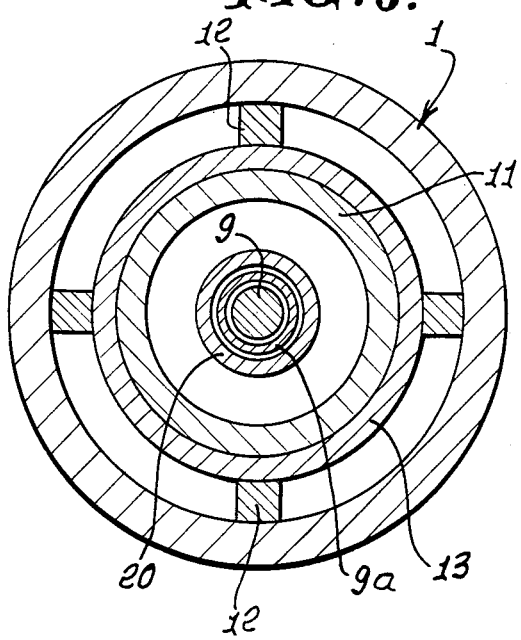

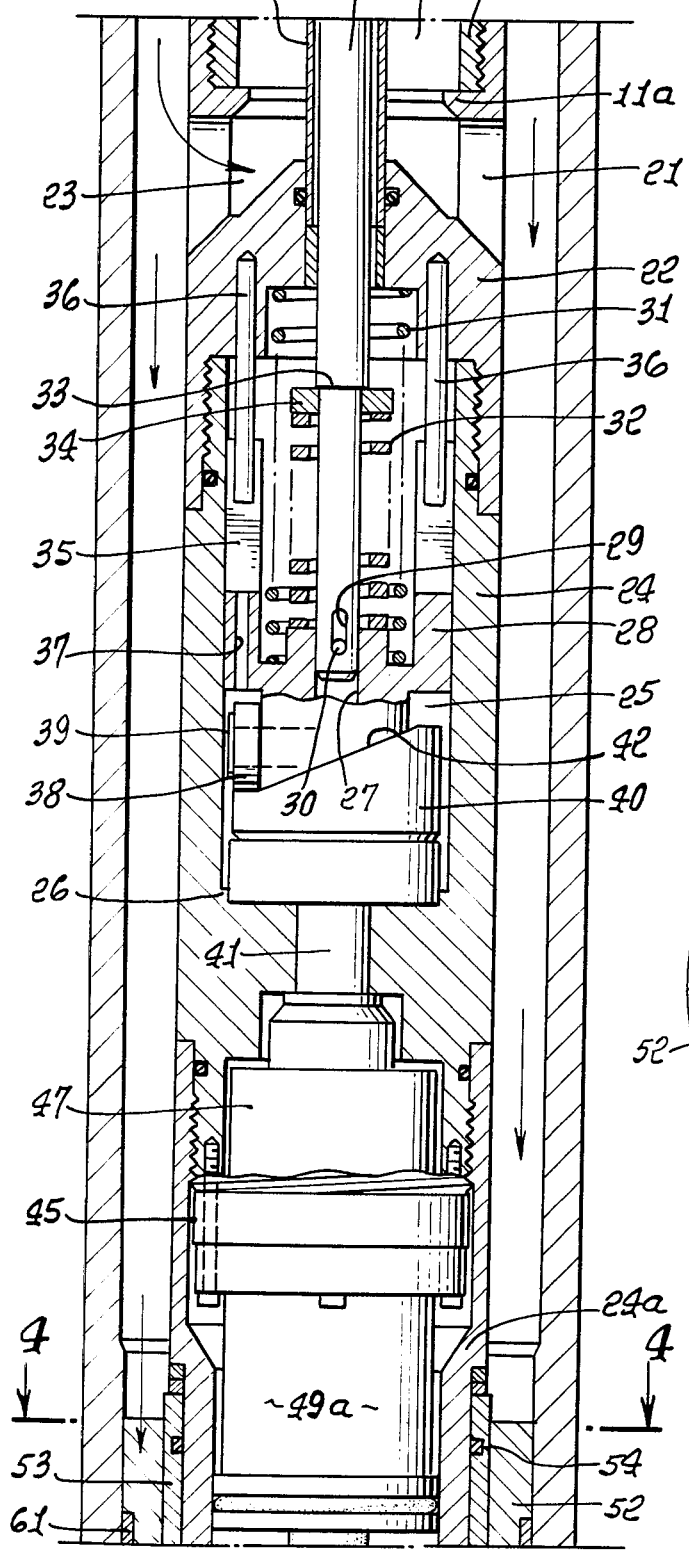
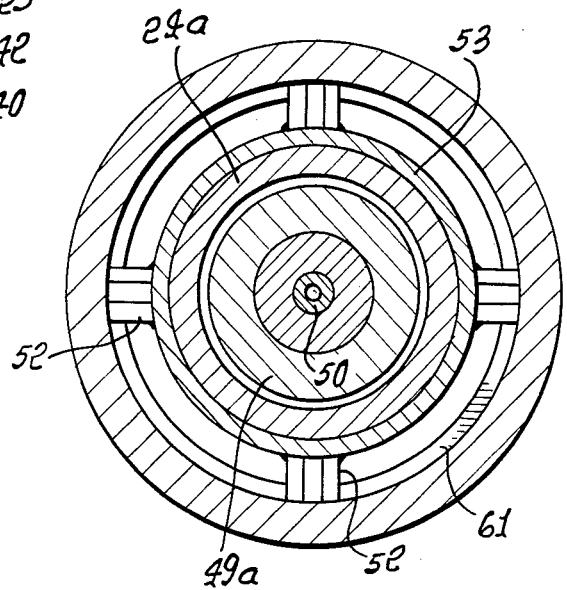

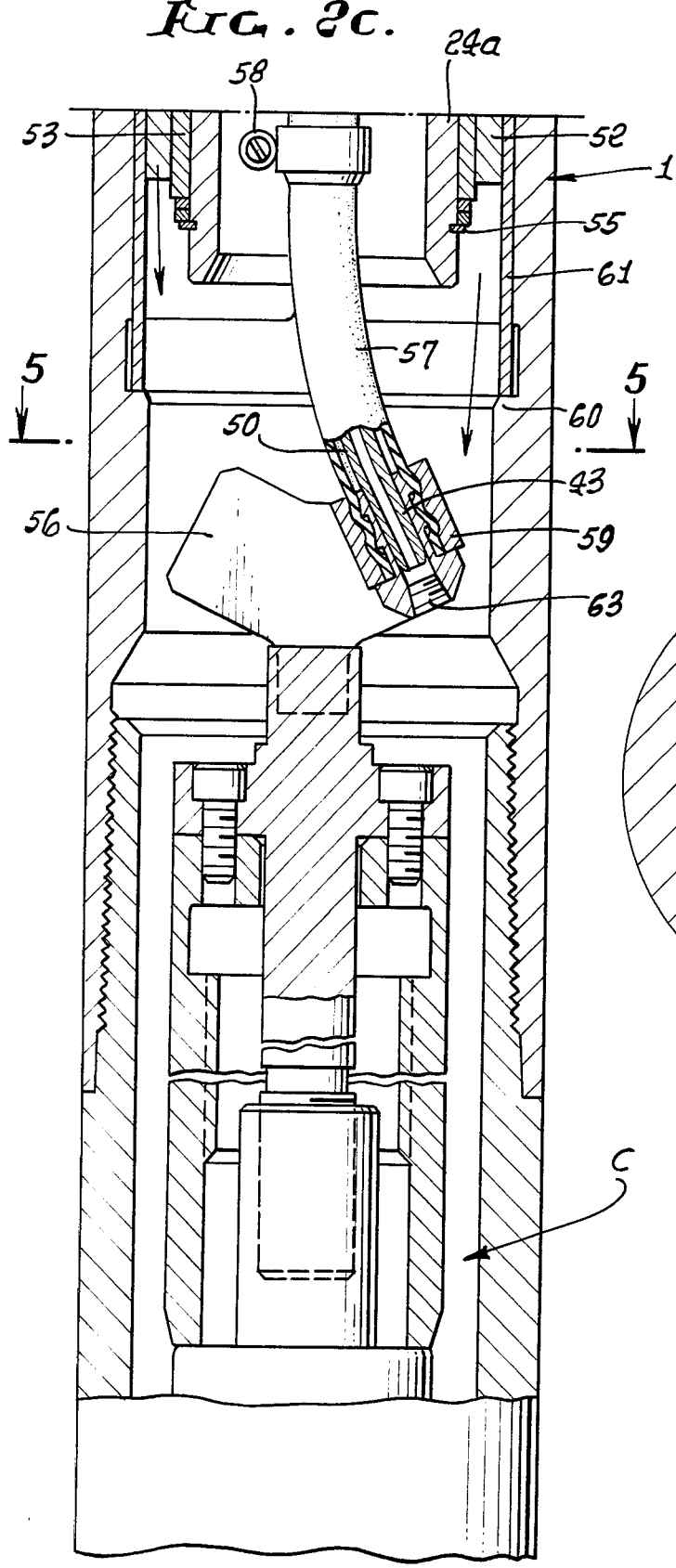

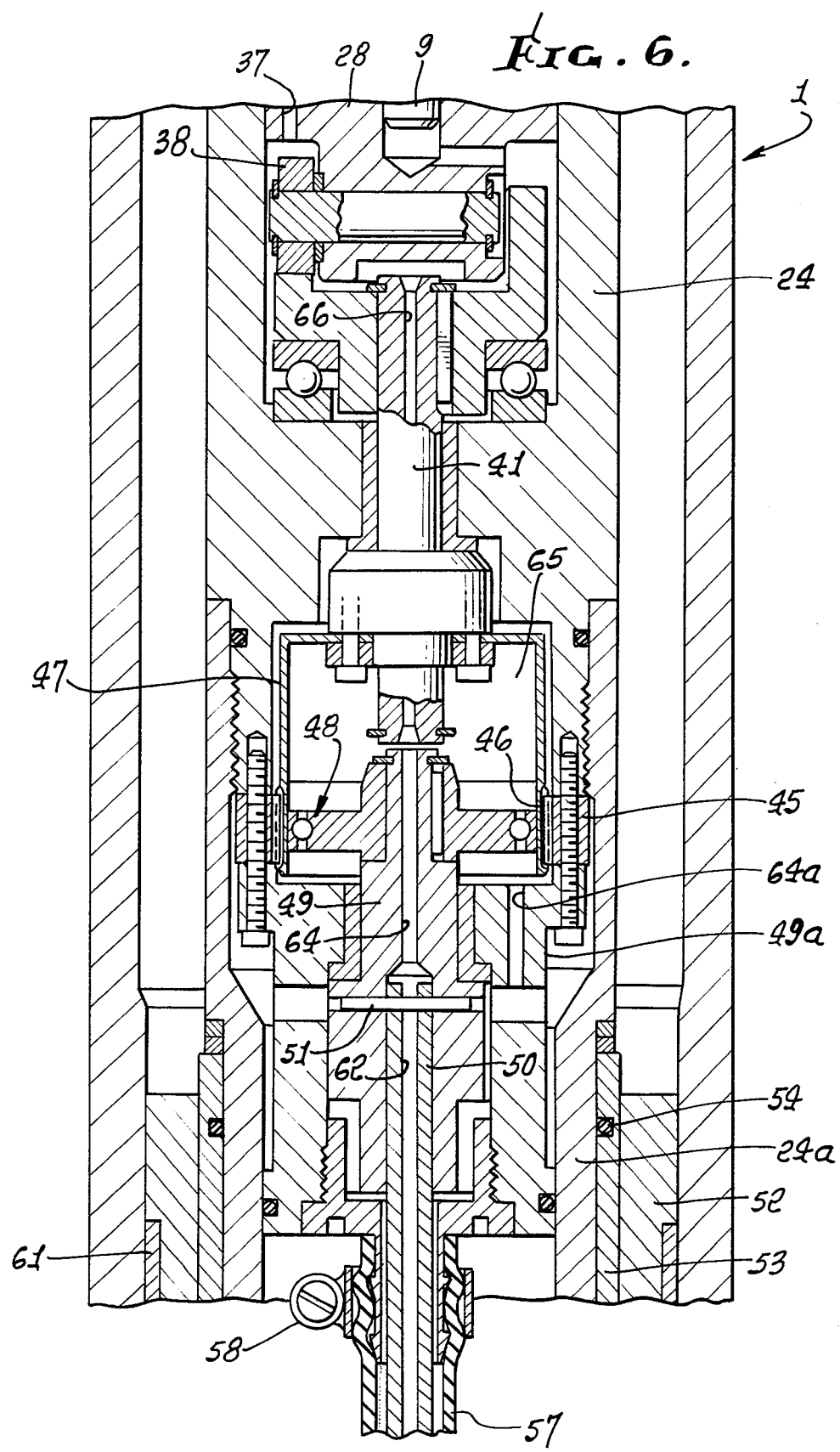

IN-HOLE MOTOR TACHOMETER

BACKGROUND OF THE INVENTION

Fluid driven turbines have been used as in-hole motors positioned adjacent the bit in a drill string to rotate the bit by means of the drilling fluid pumped down the drill string from the surface through the turbine and the bit to be circulated up the annulus between the drill string and the bore hole.

In such motors the torque developed by the turbine to effect drilling is at given drilling fluid circulation rate inversely proportional to the speed of rotation (rpm - revolutions per minute) of the motor. Further, both the efficiency and the horse power developed by the motor passes through a maximum as the rpm increases, falling sharply as the rpm increases beyond the optimum rpm.

It is highly desirable for the driller to have information as to the rpm of the motor during drilling.

It has been suggested in the prior art (see Jeter, U.S. Pat. No. 3,065,416) to measure the rpm of an in-hole turbine motor connected to a bit, by generating variations in pressure in the drilling fluid pressure to the turbine, which is measured at the surface, responsive to the rpm of the turbine.

In such a device, the mechanism for moving the throttling valve is exposed to the drilling fluid which, in many cases, is drilling mud. The mud is a suspension of a thixotropic clay and in the usual case contains abrasive particles, which is that portion of the mud recirculated from the bore hole, which usual screening has not removed.

STATEMENT OF THE INVENTION

A throttling valve is provided in the tachometer through which drilling fluid passes to the turbine, by mechanically reciprocating the valve member and thus varying the opening of the valve orifice in a cyclic manner. The valve member is reciprocated at a rate proportional to the rate of rotation of the turbine through rpm (rate of rotation) reducer and a cam mechanism.

The translation of the valve member to change the valve orifice opening and thus the nature of the pulses of pressure generated in the drilling mud is independent of the drilling mud pressure and thus is independent of the chemical or physical characteristics of the mud or the conditions in the bore hole.

The mechanism for reciprocation of the valve member is isolated from the erosive effects of the drilling mud by encasing the mechanism in a lubricant such as lubricating oil.

The mechanical reciprocation of the valve member permits of a simplification of the tachometer which is useful in oil well drilling equipment with an improvement in accuracy of performance.

In a general sense the tachometer of my invention comprises an input shaft which may be coupled to the motor whose rpm is to be measured. The input shaft is connected through a speed reducer to a cam and cam follower to the valve member. The valve member is reciprocated through the connection on rotation of the cam at a rate proportional to and less than the rate of rotation of the input shaft.

The variations in the pump input pressure to the drill string resulting from the variations in flow resistance caused by the variation in the valve orifice is sensed at the surface where it may be recorded as a function of time by conventional instrumentation. The record will be a series at pulses of a time rate proportional to the rpm of the input shaft determined by the design parameters of the speed reducer and cam as described below.

The tachometer of my invention and the mechanism operative to reciprocate the valve member is in use subject to high hydraulic forces. Means is provided in my invention to protect the tachometer assembly and the valve member and translation mechanism by balancing the hydraulic forces of the drilling fluid imposed on the tachometer assembly.

Provision is made to resiliantly mount the valve member for reciprocation whereby an overload on the valve member is balanced to avoid excessive pressure drops across the orifice.

Notwithstanding the high pressures in, and fluid velocities through the tachometer, the design of the tachometer of my invention introduces a limited amount of back pressure restricted in practical effect to limit the pressure drop across the throttle valve orifice.

DETAILED DESCRIPTION OF THE INVENTION

The best mode of my invention, as I presently conceive it to be, will be further described by reference to the drawings.

FIG. 1 is a schematic showing of a drill string in which the tachometer of my invention may be used.

FIG. 2a is the upper portion of the mid-section of FIG. 1, taken on line 2—2 of FIG. 1.

FIG. 2b is an intermediate section of FIG. 1, taken on line 2—2 of FIG. 1.

FIG. 3 is a section of FIG. 2a taken on line 3—3;

FIG. 2c is a lower view of FIG. 1, taken on line 2—2 of FIG. 1.

FIG. 3a is a section of FIG. 2a, taken on line 3a—3a of FIG. 2a.

FIG. 4 is a section of FIG. 2b taken on line 4—4 of FIG. 2b.

FIG. 5 is a section of FIG. 2c, taken on line 5—5 of FIG. 2c.

FIG. 6 is a figure similar to FIG. 2b but showing the parts in section which are shown in elevation in FIG. 2b.

FIG. 7 is similar to FIGS. 2a and 2b, but showing the valve member in its upper position in the valve orifice.

In FIG. 1, the drill string is composed of drill pipe, drill collars A supported in a drilling rig and connected to the tachometer B of my invention and to turbine motor C, such as has been used in the drilling of oil wells, modified as will be described below. The turbine shaft drives a drilling bit D. The drilling fluid is pumped down the drill string through the tachometer and drives the turbine and the bit, circulates through the bit nozzles, as is conventionally provided in such bits, and circulates up the annulus E to the surface.

The tachometer housing 1, also named sub 1, is connected to the drill string A and to the turbine C, so that the drilling fluid passing down the drill string flows through the tachometer, enters and flows through the turbine C (see FIG. 2c).

The tachometer includes the throttle valve and tachometer assembly positioned in housing 1. The tachometer valve (see FIG. 2a) is composed of orifice ring 4, sealed by O rings 5, mounted with valve orifice 6. The orifice retainer 7 sits on upper stabilizer 12 (see FIGS. 2a and 3) through transfer tube 10. The valve member 8, grooved at 8a, is mounted on output shaft 9.

The shaft 9 is centered by slotted tube 9a. The knob 8 acts as the valve member to vary the orifice opening. Complete closure of the orifice is prevented by the grooves 8a, thus preventing water hammers and turbine stall.

The stabilizer 12 is composed of four fins spaced at 90° intervals secured to the transfer tube 13 held on flange shoulder 14 by ring 15. The shaft 9 is guided in housing 11 by O ring 3, bearing 16 and slotted tube 9a.

The housing 11 is formed with an open ended cylindrical chamber 17 containing ports 18 sealed by plugs 19 (see FIGS. 2a and 2b). The equalizer piston 20 is slideably positioned in cylinder 17. It is guided by bearing tube 9a and suitably sealed by O rings 3 mounted between the interior and exterior surfaces of the piston and the surfaces contiguous thereto.

The housing 11 is connected to the tubular extension 21 (see FIG. 2b) extending from cam housing cap 22. The tubular extension 21 is notched to provide passageway 23 from the exterior of housing 11 and cam housing cap 22 to underneath the equalizer piston 20.

The cam housing 24 is bored to form a chamber 25 having floor 26 which is counterbored for purposes described below.

The shaft 9 extends through the cap 22 into chamber 25 (see FIGS. 2b, 6 and 7) and into the bore 27 of the cam follower body 28. The shaft is slotted at 29 and pin 30 passes through the slot 29 and into the cam follower body 28.

The spring 31 is positioned within the chamber 25 between the cam follower body 28 and the cap 22 and concentric with shaft 9. The spring 32 extends between the cam follower body and shoulder 33 on shaft 9 and biases the shaft through the washer 34.

The cam follower body 28 is notched at 35. The pins 36 pressed into the housing cap 22 extend into the notches. The cam follower body is bored at 37 connecting the space in chamber 25 below the cam follower body 28 with the space above the cam follower body.

The cam follower 38 is journaled on journal 39, and rides on the surface of cam 40 (see FIGS. 6 and 7). The tubular cam is mounted on the cam shaft 41.

The vertical displacement of the cam follower 38 and the cam follower body 28 as a function of the angular rotation of the cam 40 follows a substantially sinusoidal relation whereby one half turn of 180° of the cam lifts the cam follower the required height to displace the shaft 9 sufficiently to move the valve knob 8 from the full open position to the extreme elevated position (see FIGS. 2a and 7).

The cam follower is held against rotation by the pins 36 which, as has been described above, are pressed into cap 22 and entered into notches 35.

The cam 40 is rotated by crank arm 43 (see FIG. 2c) through the speed (rpm) reducer (see FIGS. 2b and 6).

The time rate of reciprocation of the knob 8 caused by the rotation of the cam is held reasonably low in order to prevent confusion so that the time rate of the pressure pulses at the surface is held low and thus may be distinguished from the acoustic noises induced by the drilling operations.

Furthermore, the translation of the rotary motion of the input shaft 50 to the linear displacement of the output shaft 9 may occur whether the direction of rotation of the input shaft is clockwise when the turbine is in drilling mode, or counterclockwise direction when circulation through the conventional by-pass valve, such as is shown in U.S. Pat. Nos. 3,989,114 or 4,298,077, when the drill string is lowered or removed from the well as in "tripping".

For the best mode of my invention, as I presently contemplate it to be, I prefer to use the Harmonic Drive by USM and illustrated in FIGS. 2b and 6.

The drive is composed of the fixed circular spline case 45 bolted to cam housing 24 and carrying internal spline teeth 46. The non-rigid cylindrical thin walled cup 47 carries external spline teeth which mesh with the spline teeth 46 of the circular spline. The splines 46 are two less in number than spline teeth 46 and are on a smaller pitch diameter. The elliptical ball bearing assembly 48 is rotatably mounted on drive shaft 49 and pinned to input shaft 50 by pin 51.

The non-rigid member 47 conforms to the eliptical assembly 48 and causes a limited number of splines on the nonrigid member to mesh with the spline teeth on the circular spline.

Housing extension 24a on housing 24 which is positioned in housing 1 by stabilizer 52 arranged at 90° intervals secured to transfer tube 53 similarly to the stabilizers 12 (see FIG. 4). The transfer tube 53 is sealed by O ring 54 and held by retaining ring 55 (see FIGS. 2c and 6).

The turbine may be any conventional turbine, for example, such as is presently employed in drilling of bore holes. Since such turbines are standard equipment, except for the paddle described below, well-known to those skilled in this art, the description is omitted for purposes of brevity.

The paddle 56 is mounted on the rotor shaft of the turbine and extends into housing 1. The tachometer input shaft 50 at its end is bent into crank arm 43 against which the paddle 56 may push to rotate the input shaft 50 (see FIG. 2c). As shown in FIGS. 2c and 6, the input shaft and crank extension are encased in a flexible sheath 57 clamped by clamps 58 and 59.

The tachometer load is transferred to the internal shoulder 60 of housing 1 through transfer tube 61. The tachometer is thus secured in housing 1 between the shoulder 60 and ring 2 of FIG. 2a.

Prior to the assembly of the tachometer plugs 19 are removed from ports 18 (see FIGS. 2a and 7) and the chamber 17 above the equalizer piston 30 is filled with lubricating oil displacing the equalizer piston to seat on the internal should 11a at the end of housing 11.

The cam housing 24 (see FIG. 6) may be evacuated through bore 62 in drive shaft 50 by removing the plug 63 at the end of crank 43. The bore 62 communicates with the space 65 above and below the elliptical assembly 48. This is established through the bore 64 in the shaft 49 and the bore 64a in input eliptical assembly drive shaft case 49a. Communication is also had through bore 66 in shaft 41 with the cam housing containing the cam mechanism.

Communication is also provided from beneath cam follower body 28 to above the body through bore 37. The slotted tube 9a provides for fluid passage-way. (See FIG. 2b)

After evacuation of the spaces through the above fluid passageways, the spaces may be filled with lubricating oil through ports 18 and the passages stated above and the annulus between shaft 9 and slotted tube 9a to above the equalizer piston 20.

As will be seen all moving parts of the transducer within the housings 11 and 24 and 24a are enclosed in lubricating oil against intrusion of drilling mud. The input shaft is secured against erosion by drilling mud by the flexible casing 57.

Drilling fluid entering the housing 1 (FIGS. 2a and 7) flows between the housing and the tachometer assembly as shown by the arrows on the figures. The hydraulic thrust of the flowing drilling fluid exerted on cap 11 transferred through transfer tube 61 (see FIG. 2b) is carried on the shoulder 60 (see FIG. 2c). The load is balanced by the fluid pressure of the drilling mud which is communicated from the annulus between the tachometer assembly and the housing 1 through the ports 21 to piston 20 (see FIGS. 2b and 7).

The free floating equalizer piston 20 compensates for changes in thrust arising from variations in drilling fluid flow rate and temperature changes.

The tachometer assembly is centered in housing 1 by the stabilizers 12 (see FIGS. 2a and 7) and stabilizer 51 (see FIGS. 2b and 2c).

The turbine rotor operates at a high rpm. For purposes of illustration and not as any limitation of my invention, such motors used in oil well drilling, for example, a $6\frac{3}{4}''$ motor operating with 50 stages operating at 450 gallons per minute of 10 lb. mud will experience about 225 to 250 psi pressure drop across the stator in the range of 400 to 1200 rpm of the rotor.

The torque developed by the turbine is inversely proportional to the rpm of the rotor.

Under conditions stated above for the motor used as an illustration, the torque developed is inversely proportional to the speed and ranges from about 3000 to 2000 foot pounds.

The efficiency and the horsepower developed by the turbine passes through a maximum as the speed of the rotor increases. In the case of the rotor used as an illustration, the efficiency and the horsepower rises to a maximum in the range of 600 to 800 rpm and falls sharply as the speed is increased.

Considering the above pressure drops across the turbine stator and the pressure drops specified by the bit manufacturers for suitable pressure drops across the drill bit, a reasonable pressure at the entrance to the turbine used as an example is in the range of about 600 to about 800 psi.

In order to obtain a sufficiently sharp pulse signal at the surface, depending on the depth of the bore in the earth, a suitable pressure drop is about 100 to about 200 psi across the valve orifice at the maximum elevation of valve knob 8.

This pressure drop consists substantially entirely of the total pressure drop in the tachometer, since the entire flow of drilling fluid by-passes the tachometer actuating mechanism and exits the tachometer into the turbine to which it may be connected. In order to limit the pressure drop across the valve orifice on the extreme of the travel of the valve knob 8 towards the orifice 6, the knob is grooved at 8a (see FIGS. 2a and 3a). The grooves prevent the complete closure of the orifice and also the development of water hammer.

The turbine output shaft, as stated above, rotates at a high rpm. The axial translation of the valve knob 8 is desirably at a much smaller time rate. The rotation of the paddle 56 and crank 43 and input shaft 50 is at the rpm of the turbine output shaft. A speed reducer is imposed between the input shaft 50 and the cam 40 (see FIGS. 2b and 6).

The cam follower rises through its vertical movement on 180° rotation of the cam (see FIG. 7) and returns to its lower position on 360° rotation of the cam (see FIG. 2b). In so doing, the knob 8 travels from the position shown in FIG. 2a to the position shown in FIG. 7. The relation of the degree of rise of the cam follower and the linear travel of the valve knob 8 is substantially sinusoidal.

Due to the sonic velocity of the resultant pressure wave and the frequency of the sonic noise developed in the bore hole during drilling, it is desirable in the preferred embodiment of my invention, to severly limit the frequency of the pressure wave developed by the cyclic translation of the valve knob 8 as it cyclically reduces and enlarges the valve orifice 6 during circulation of the drilling fluid.

For example, and not as a limitation of my invention, if N is the rpm of the input shaft 50, a useful time rate of reciprocation of the valve knob 8 is A where $A=(60\times a)/N$; where "a" is a factor in the range of about 100 to about 200.

Thus if "a" is taken as 160, the period of the pressure pulses developed by the reciprocation of the valve knob 8 upon rotation of the input shaft 50 to 1000 rpm, will be 9.6 seconds and at 1200 rpm it will be 8 seconds and at 400 rpm it will be 24 seconds.

For the best mode of my invention, as I contemplate it to be, the preferred period of the pulses is in the range of about 2 to about 10 pulses per minute.

The gear ratio of the speed reducer is thus 1/a and for the values stated above the rpm of the shaft 50 may be in the range of about 400 to about 2000 rpm to develop a useful pressure pulse rate.

The pulses developed by the cyclic translation of the knob 8 is at a frequency which permits of adequate filtering to isolate the higher frequency noises of drilling and recording of the resultant low frequency pulses generated by the tachometer. Such procedures and the recording of the resultant low pressure pulses at the surface which occur at the input from the pump will be well known to those skilled in this art.

The output shaft, as has been described, is mounted in the cam follower body which is held against rotation by pins 30 in slot 29. The spring 32 biases the output shaft and knob 8 towards the orifice 6. The spring constant of spring 32 is sufficiently large to extend the shaft 9 against the hydraulic pressure imposed on the knob 8, so as to hold the pin 30 in the slot 29 as shown in FIGS. 2b, 6 and 7.

As the cam follower cycles it imposes a cyclic force on the spring 32 which thus holds the shaft 9. The shaft 9 is thus resiliantly connected to move with the cam follower without substantial deflection of the spring 32.

Should the pressure of the drilling fluid exerted on the valve knob 8 increase substantially, the additional back pressure at the valve knob 8 will compress the spring 32 and deflect the shaft 9 in slot 29 into the bore 27 (see FIG. 2b), thus increasing the orifice opening and reducing the pressure.

The spring 32 thus acts as overload protection to limit the magnitude of the pressure drop across the orifice 6, and substantial increases of the flow rate of the drilling fluid.

I claim:

1. An in-hole tachometer suitable for use with fluid-driven in-hole turbines comprising:
   (a) a tachometer housing;
   (b) a throttle valve mounted in said housing, including a valve orifice and a valve member cooperating with said orifice;

(c) a tachometer assembly mounted in an assembly housing within said tachometer housing, said tachometer assembly including:
  (1) an input shaft rotatably mounted in said assembly and extending into said assembly housing,
  (2) an output shaft connected at one end of said shaft to the valve member and extending from said assembly housing,
  (3) a cam mechanism including a cam follower and a cam connected to said input shaft,
  (4) a speed reducing mechanism connecting said input shaft to said cam,
(d) a free-floating piston in said assembly housing,
(e) lubricant passageways for introduction of lubricating oil into the assembly housing on one said of said free-floating piston,
(f) fluid passageways in said assembly housing from said orifice and between said tachometer housing and said assembly housing to the end of said tachometer housing, and
(g) inlet ports to said assembly housing underneath the said piston.

2. An in-hole tachometer suitable for use with fluid-driven in-hole turbines comprising:
(a) A tachometer housing;
(b) A throttle valve mounted in said tachometer housing, including a valve orifice and a valve member cooperating with said orifice;
(c) A tachometer assembly mounted in an assembly housing within said tachometer housing, said tachometer assembly including;
  (1) an input shaft rotatably mounted in said assembly and extending into said assembly housing,
  (2) an output shaft connected at one end to said valve member and extending from said assembly housing,
  (3) a cam mechanism including a cam and a cam follower connected to said output shaft,
  (4) a speed reducing mechanism connecting said input shaft to said cam,
  (5) said output shaft resiliently mounted on said cam follower
(d) a free-floating piston in said assembly housing,
(e) lubricant passageways for introduction of lubricating oil into the assembly housing on one side of said free-floating piston in said assembly housing,
(f) fluid passageways in said assembly housing from said orifice and between said tachometer housing and said assembly housing to the end of said tachometer housing, and
(g) inlet ports to said assembly housing underneath the said piston.

3. An in-hole tachometer suitable for use with fluid-driven in-hole turbines comprising:
(a) a tachometer housing;
(b) a throttle valve mounted in said tachometer housing, including a valve orifice and a valve member cooperating with said orifice;
(c) a tachometer assembly mounted in an assembly housing within said tachometer housing, said tachometer assembly including;
  (1) an input shaft rotatable mounted in said assembly,
  (2) an output shaft connected at one end of said shaft to the valve member,
  (3) a cam mechanism including a cam follower and a cam connected to said input shaft,
  (4) a speed-reducing mechanism connecting said input shaft to said cam,
  (5) a cam housing and a tubular extension from said cam housing,
  (6) an end closure for said tubular extension and said cam housing, said input shaft extending from one end of said cam housing and said output shaft extending from the said tubular extension end closure,
  (7) a free-floating piston in said tubular extension concentrically mounted about said output shaft, and
  (8) ports in said tubular extension connecting the volume of the tubular extension between said piston and said end closure with the exterior of said end closure with the exterior of said assembly housing.

4. The tachometer of claim 3 in which said speedreducing mechanism and said cam function such that the time rate (a) of reciprocation of said valve member and the rpm (N) of the input shaft are related by:

$$ a = (60 \cdot a)/N $$

5. The tachometer of claim 3, further including a first port in said cam housing for introduction of lubricant into said cam housing, and a closure for said first port; a second port to said tubular extension between said piston and said tubular extension end closure, and a closure for said second port.

* * * * *